United States Patent
White et al.

(10) Patent No.: US 6,526,488 B1
(45) Date of Patent: *Feb. 25, 2003

(54) COMPUTER SYSTEMS

(75) Inventors: Norman Jackson White, Kinross; Reginald Killean, deceased, late of Burntisland, by Hannah Bain Wilson or Killean, executrix; David Robb, Kirkcaldy, all of (GB)

(73) Assignee: Arendee Limited, Edinburgh (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/590,133

(22) Filed: Jun. 9, 2000

Related U.S. Application Data (62) Division of application No. 08/816,451, filed on Mar. 12, 1997, now Pat. No. 6,092,161.

(30) Foreign Application Priority Data

Mar. 13, 1996 (GB) .............................................. 9605338

(51) Int. Cl.⁷ .............................................. G06F 12/16
(52) U.S. Cl. ........................ 711/163; 711/202; 713/200
(58) Field of Search ................................ 711/163, 173, 711/162, 165, 166, 202; 713/1, 2, 200; 714/37, 7, 21

(56) References Cited

U.S. PATENT DOCUMENTS

| | | | | |
|---|---|---|---|---|
| 5,008,786 A | * | 4/1991 | Thatte ........................ | 711/162 |
| 5,136,711 A | | 8/1992 | Hugard et al. .............. | 395/652 |
| 5,367,682 A | | 11/1994 | Chang ........................ | 395/651 |
| 5,448,045 A | | 9/1995 | Clark ........................ | 235/382 |
| 5,511,184 A | | 4/1996 | Lin ........................... | 395/734 |
| 5,537,540 A | | 7/1996 | Miller et al. ........... | 395/183.14 |
| 5,566,314 A | * | 10/1996 | DeMarco et al. ........... | 711/103 |
| 5,619,696 A | * | 4/1997 | Nakagawa ................. | 709/100 |
| 5,657,473 A | | 8/1997 | Killean et al. .............. | 711/163 |
| 5,666,514 A | * | 9/1997 | Cheriton ..................... | 711/144 |
| 5,701,477 A | | 12/1997 | Chejlava, Jr. ............... | 395/652 |
| 6,249,872 B1 | * | 6/2001 | Wildgrube et al. ......... | 713/200 |

FOREIGN PATENT DOCUMENTS

| | | | |
|---|---|---|---|
| GB | 2 231 418 A | 11/1990 | |
| WO | WO 91/13403 | * 9/1991 | .......... G06F/11/00 |
| WO | WO 93/09495 | 5/1993 | |
| WO | WO 93/13477 | 7/1993 | |

* cited by examiner

*Primary Examiner*—Do Hyun Yoo
*Assistant Examiner*—Gary J. Portka
(74) *Attorney, Agent, or Firm*—Nixon Peabody LLP; Stuart J. Friedman (57) ABSTRACT

There is disclosed a method and apparatus for controlling access to and corruption of information in a computer system. In known "PC Virus" protection methods the boot partition becomes "Read Only" when the system is in Supervised Mode. However, Microsoft Windows, although not strictly self-modifying, does require that certain files located within the Windows directory, can be written to. Accordingly the present invention provides a method of controlling access to and modification of information stored on a storage medium forming part of a computer system comprising: dividing information stored on the storage medium into a plurality of non-overlapping partitions including a boot partition and at least one general partition, characterised by: designating at least one of said partitions a Write Many Recoverable (WMR) partition wherein, in use, if a write command is issued to overwrite any resident information stored in a/the WMR partition by updating information is written on the storage medium in a location other than where the resident information is stored and a (virtual) pointer to the updated information is set up/kept so that the updated information can be accessed, as required during a remainder of a session.

16 Claims, 7 Drawing Sheets

COMPUTER SYSTEMS

This application is a Divisional of application Ser. No. 08/816,451, which was filed Mar. 12, 1997 now U.S. Pat. No. 6,092,161.

BACKGROUND OF THE INVENTION

The present invention relates to a method and apparatus for controlling access to and corruption of information in a computer system.

PCT/GB91/00261 (WO91/13403) now U.S. Pat. No. 6,092,161 also by the present inventors (the disclosure of which is incorporated herein by reference) discloses a method and apparatus particularly concerned with the detection and containment of hostile programs such as "virus" programs within computer systems. In this document there is disclosed a method of (and related apparatus for) controlling access to and modification of information stored on a storage medium forming part of a computer system comprising:

dividing information stored on the storage medium into a plurality of non-overlapping partitions, including a boot partition and a plurality of general partitions, each of the partitions being further divided into a plurality of sectors, any designated subset of the general partitions being active at any given time when the computer system is in use, characterised by providing supervising means (a Supervisor) separate of a central processing unit (CPU) of the computer system and made inaccessible to the user for controlling the performance of read, write and format operations upon the information stored on the storage medium so as to allow, restrict or prevent such operations depending upon the type of information stored within a sector and type and status of the partition within which the sector is located, the supervising means causing a reset to be required of the computer system should an attempt be made to perform a prohibited read, write or format operation, said reset causing memory to be cleared and the operating system to be loaded.

In the invention disclosed in PCT/GB91/00261 the boot partition becomes "Read Only" when the system is in Supervised Mode. This prevents attack by a virus, whilst allowing execution of DOS utilities and programs providing they are not self-modifying.

Since the conception of virus isolation according to PCT/GB91/00261 there have been changes and improvements to PC operating systems. These present certain limitations to the scope of the virus isolator invention. For example:

(1) Microsoft Windows, although not strictly self-modifying, does require that certain files located within the Windows directory, can be written to.

(2) A system administrator may install an executable in the boot partition without knowing it is self-modifying. If such an executable is installed in the boot partition self-modification of this program is attempted when the system is in Supervised Mode, the Supervisor will block the write attempt and freeze the system.

(3) Microsoft Windows virtual memory manager may require write access to either or both the Windows directory and the root directory of the boot partition.

(4) Network software may require access to the boot partition.

(5) In general, with a complex operating system, making the boot partition 'Read Only' is restrictive and may cause incompatibility and high administration overhead.

It is an object of the present invention to obviate or mitigate the aforementioned problems.

SUMMARY OF THE INVENTION

According to a first aspect of the present invention there is provided a method of controlling access to and modification of information stored on a storage medium forming part of a computer system comprising:

dividing information stored on the storage medium into a plurality of non-overlapping partitions including a boot partition and at least one general partition, characterised by designating at least one of said partitions a Write Many Recoverable (WMR) partition wherein, in use, if a write command is issued to overwrite any resident information stored in a/the WMR partition by updated information the updated information is written on the storage medium in a location other than where the/any resident information is stored and a (virtual) pointer to the updated information is set up/kept so that the updated information can be accessed, as required during a remainder of a session.

A system reset causes the updated information, together with the list of pointers to this information, to be cleared. This returns the WMR partition to it's original state as configured in Unsupervised Mode.

Providing such a WMR partition is virus-free to start with it will be virus-free at the start of each new session.

Preferably a boot partition on the storage medium would be WMR protected. A general partition could also be WMR protected should a user require it.

The basis of the method according to the first aspect of the present invention to achieve this is to set up a scheme in which the original information stored in the WMR partition is keep unaltered and that datawhich would normally overwrite it is stored securely elsewhere on the storage medium where it can be accessed as required during the remainder of a session. The scheme defines how this is done efficiently in terms of minimal additional storage space and minimal reduction in throughput time while at the same time providing maximum security.

Preferably according to the method of the first aspect of the present invention there is also provided supervising means (a Supervisor) separate of a central processing unit (CPU) of the computer system and made inaccessible to the user, said supervising means allowing/restricting/prohibiting read/write operations upon the storage medium depending upon whether information to be read from a sector or written to a sector is operating system information or user information, whether the sector is in the boot partition or in a general partition, and whether the partition is active or inactive, said supervising means also allowing a format operation only on a general partition which is active and prohibiting a format operation on the boot partition or on a general partition which is inactive, and causing a warning to be issued to the user should an attempt be made to perform a prohibited read, write or format operation.

Preferably, space is reserved on the storage medium which may be accessed only by the Supervisor, referred to as the dedicated area 2. The dedicated area may be a special partition, a range of sectors within the WMR partition, or unallocated sectors withing a dormant partition.

Each WMR partition has a Sector Relocation Table (SRT) associated with it which table is held in Supervisor RAM, each entry in a SRT defining the address of a range of sectors in the WMR partition that have been updated and the address where the updated information is located, this location being within the dedicated area.

According to a second aspect of the present invention there is provided an apparatus for controlling access to and modification of information stored on a storage medium of a computer system, the storage medium being divided into a plurality of non-overlapping partitions including a boot partition and at least one general partition, characterised in that at least one of said partitions comprises a Write Many Recoverable (WMR) partition wherein, in use, if a write command is issued to overwrite (ie, update) any information stored in the WMR partition the updated information is stored elsewhere on the storage medium and a pointer to this information kept so the information can be accessed as required during the remainder of the session, wherein a system reset causes the updated information, together with the list of pointers to this information, to be cleared, thus returning the WMR partition to its original state as configured in Unsupervised Mode.

Preferably the apparatus further comprises a supervising means (a Supervisor) separate of a central processing unit (CPU) of the computer system and made inaccessible to the user, said supervising means allowing/restricting/prohibiting read/write operations upon the storage medium depending upon whether information to be read from a sector or written to a sector is operating system information or user information, whether the sector is in the boot partition or in a general partition and whether if the partition is a general partition the partition is active or inactive, said supervising means also allowing a format operation only on a general partition which is active and prohibiting a format operation on the boot partition or on general partition which is inactive, the supervising means causes a warning to be issued to the user should an attempt be made to perform a prohibited read, write or format operation said operation being prevented by the Supervisor.

According to a third aspect of the present invention there is provided a method of controlling access to and modification of information stored on a storage medium forming part of a computer system comprising:

dividing information stored on the storage medium into a plurality of non-overlapping partitions including a boot partition and at least one general partition, characterised by designating at least one of said partitions a Write Many Recoverable (WMR) partition wherein, in use, if a write command is issued to overwrite any information stored in a/the WMR partition prior to undertaking said write command said information is copied and stored elsewhere on the storage medium to be copied back to said WMR partition when required—for example upon a system reset.

It is apparent that according to the third aspect of the present invention a previously "Read Only" partition, such as the boot partition, is permitted to be written to without limit during a session. At the start of a new session, however, all changes to the partition are undone and the partition is restored to its original state. This partition may, therefore, be called a Write Many Recoverable (WMR) partition. Provided such a partition is virus-free to start with it will be virus-free at the start of each new session.

The basis of the method of the third aspect of the present invention to achieve this is to set up a scheme in which a copy of any "cluster" in the WMR partition that is to be over-written is stored securely elsewhere on the storage medium and can be copied back when required. The scheme defines how this is done efficiently in terms of minimal additional storage space and minimal reduction in through-put time while at the same time providing maximum security.

Preferably according to the method of the third aspect of the present invention there is also provided supervising means (a Supervisor) separate of a central processing unit (CPU) of the computer system for controlling the performance of read, write and format operations upon the information stored on the storage medium so as to allow, restrict or prevent such operations depending upon the type of information stored within a sector and type and status of the partition within which the sector is located, the supervising means causing a reset to be required of the computer system should an attempt be made to perform a prohibited read, write or format operation, said reset causing memory to be cleared and the operating system to be loaded.

Preferably, the storage medium provides a special partition (Virus Isolation Space), each WMR partition having a File Allocation Table (FAT) allocated to it which table is held in said special partition, each entry in a FAT defining the address of a cluster that has been altered in the WMR partition and the address of the copy of the information originally held in said cluster.

The information originally held in said cluster may be copied to the special partition.

Alternatively, the information originally held in said cluster may be copied to an inactive partition.

According to a fourth aspect of the present invention there is provided an apparatus for controlling access to and modification of information stored on a storage medium of a computer system, the storage medium being divided into a plurality of non-overlapping partitions including a boot partition and at least one general partition, characterised in that at least one of said partitions comprises a Write Many Recoverable (WMR) partition wherein, in use, if a write command is issued to overwrite any information stored in a/the WMR partition prior to undertaking said write command said information is copied and stored elsewhere on the storage medium to be copied back to said WMR partition when required—for example upon a system reset.

Preferably the apparatus further comprises a supervising means (a Supervisor) separate of a central processing unit (CPU) of the computer system for controlling the performance of read, write or format operations stored on the storage medium so as to allow, restrict or prevent such operations depending upon the type of information stored within a sector and the type and status of the partition within which the sector is located wherein, in use, the supervising means causes a reset to be required of the computer system should an attempt be made to perform a prohibited read, write or format operation.

According to any of the foregoing method aspects of the present invention read operations may be allowed on any information in the boot partition, but an attempt to write or format the boot partition may cause a system reset.

Further, boot sectors of the storage medium may be considered to be part of the boot partition, irrespective of the position of the starting sector of the boot partition as may be defined by the storage medium operating system.

Also, reading of any operating system information sectors or user-generated information sectors in an active general partition may be allowed, writing to such user-generated information sectors may be allowed, and writing to such operating system information sectors may be restricted such that an attempt to modify the size or boundaries of the partition causes a system reset.

Only the reading of information from operating system sectors of inactive general partitions may be allowed, and an attempt to perform any other read, write or format operations on such partitions may be either denied or causes a system reset.

The restriction or prevention of the performance of read, write and format operations can be removed to allow set-up or maintenance of the storage medium and thereafter reinstated.

The storage medium may be selected from any one of a hard disk, a floppy disk, an optical disk or a tape.

Alternatively, the storage medium may be a filesaver, and the computer system is a local area network, and which user computer is using which partition of the fileserver may be determined such that an attempt by a user computer to perform a prohibited operation causes a reset to be required of the user computer.

According to any of the foregoing apparatus aspects of the present invention the apparatus may provide hardware means adapted to be incorporated into the computer system.

Alternatively, the apparatus may provide firmware means adapted to be incorporated into the computer system.

Alternatively, the apparatus may provide a combination of both hardware and firmware means, both being adapted to be incorporated into the computer system.

There may be provided a processor which may be made inaccessible to a user and to any virus and which supervises all data transfers between and within sub-divisions of the storage medium or storage media placed under its control.

BRIEF DESCRIPTION OF THE DRAWINGS

Embodiments of the present invention will now be described, by way of example only, with reference to the accompanying drawings, which are.

DETAILED DESCRIPTION OF THE EMBODIMENTS

The set-up and operation of the present invention is best understood by describing the various stages of operation involved. The embodiments of the invention hereinafter described beneficially include a Supervisor of the type disclosed previously in PCT/GB91/00261. The contents of PCT/GB91/00261 (WO 91/13403) are, therefore, incorporated herein by reference.

Figure 1:
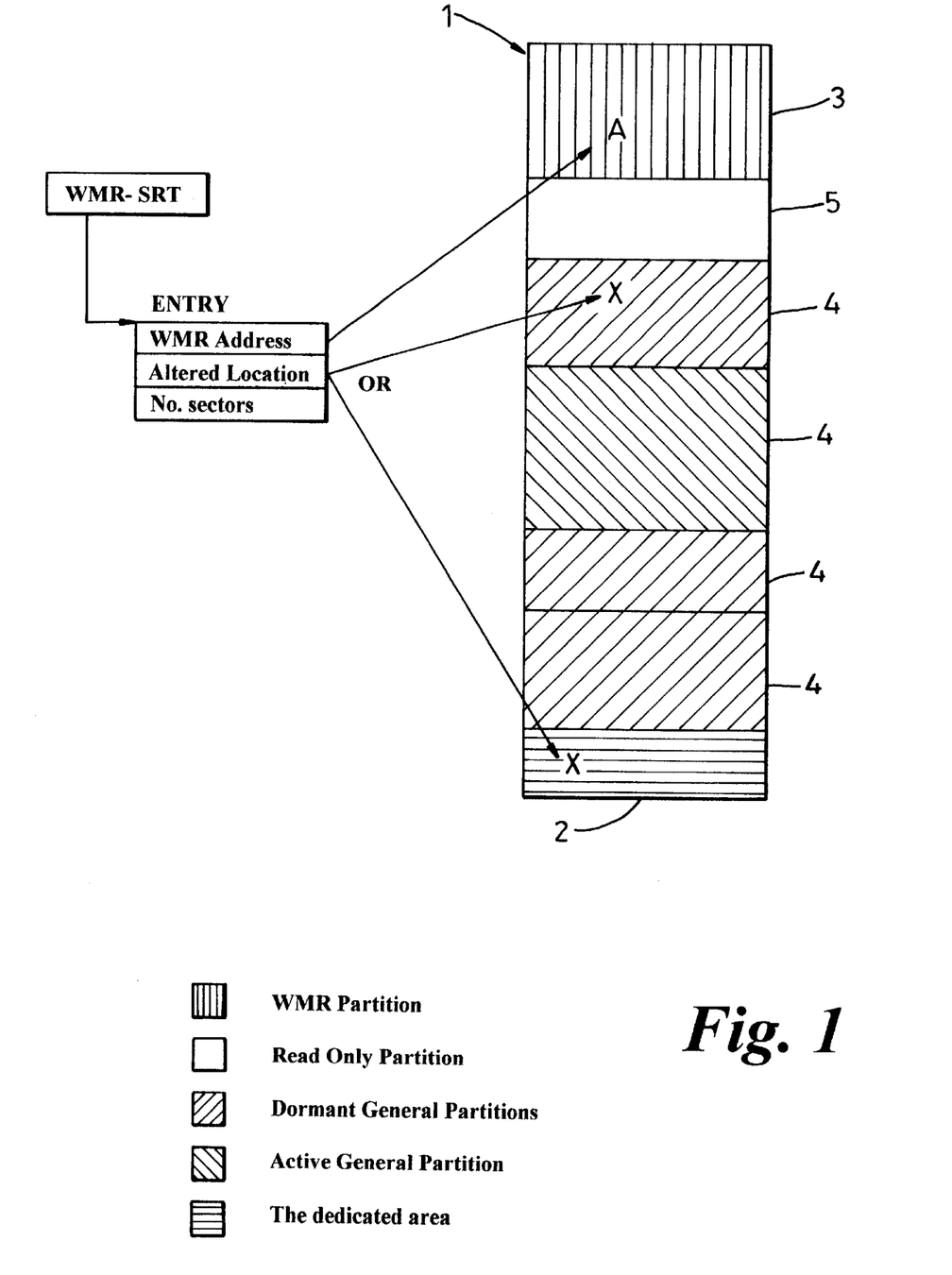
FIG. 1 a schematic diagram showing the division of a storage medium for use in a first embodiment of the present invention.
Figure 2:
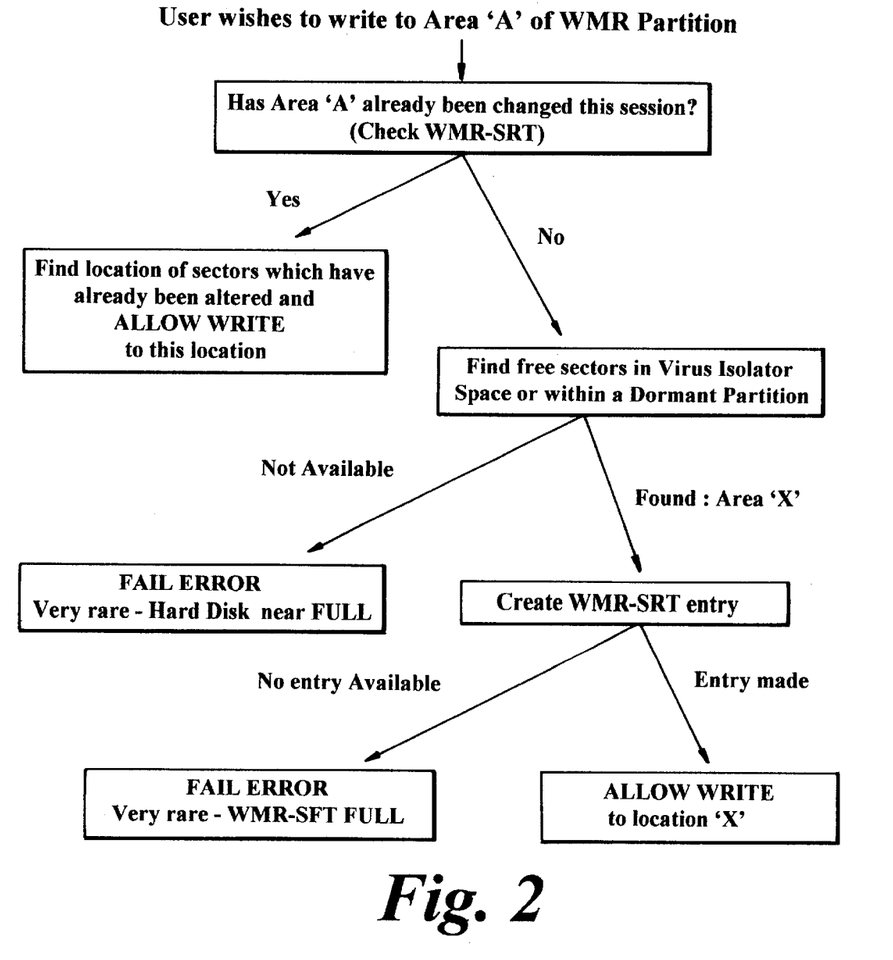
FIG. 2 a flow chart showing the sequence of events should the computer system wish to write to a Write Many Recoverable (WMR) partition used in the embodiment of FIG. 1.

Referring firstly to the first embodiment of FIGS. 1 and 2:
1.1 Initial Connection When a storage medium 1 (such as a hard disk) is first connected to a computer system (not shown), space that will be inaccessible to the user, ie, a dedicated area, is reserved on the storage medium 1.

Figure 6:
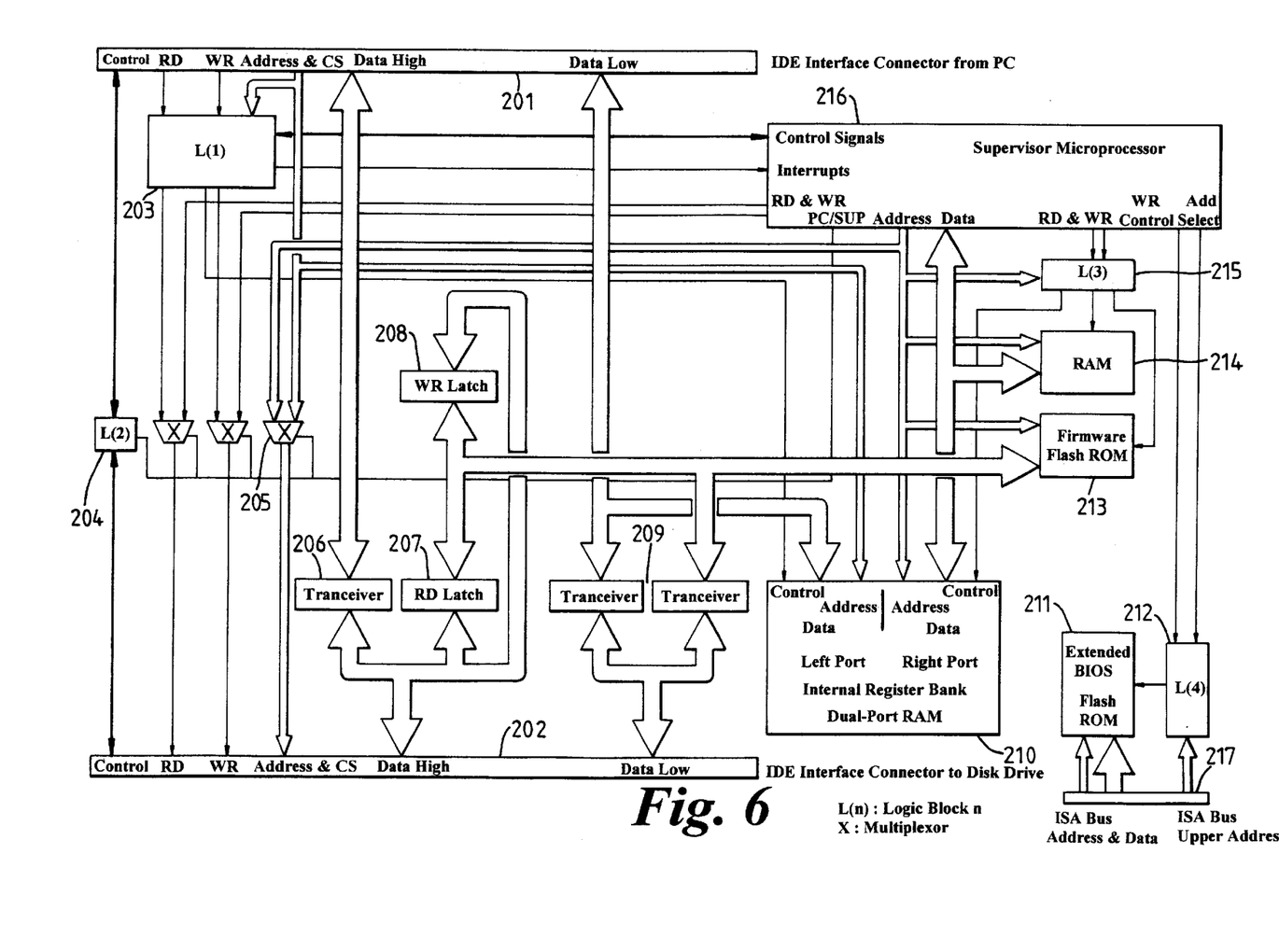
FIG. 6 a schematic block diagram of a hardware arrangement of a first embodiment of a Supervisor for use in the present invention.

A password is entered and stored in either the dedicated area 2 or in Supervisor Flash ROM (FIG. 6, 213). This password is later used to allow the system to be put into Unsupervised Mode.
1.2 Unsupervised Mode Entering this mode requires the use of the Unsupervised Mode password (reference PCT/GB91/00261). When the system is in this mode, a default partitioning scheme will be offered, although it may be reconfigurable by the user.

(a) Typically the default scheme could consist of the following partition types: Read Only (RO), Write Many Recoverable (WMR) 3, and 'general' 4. A general partition is simply a partition other than an RO or WMR partition and one which may be written to. Each WMR partition will have a Sector Relocation Table (WMR-SRT) associated with it which will be held in Supervisor RAM (FIG. 6, 214). In use, each entry in the WMR-SRT defines the address of a range of sectors which are updates of sectors within a WMR partition and includes a pointers to said range of updated sectors. Each partition could be allocated a default partition type based on general guidelines. For, example, Partition C=WMR; Partition D=RO; all other partitions= General; partition descriptors given by their partition label.

(b) The user may define a description string for each partition, defining its contents.

(c) The invention will permit the user if he wishes to to revise (a) and (b) and add partitions, change partition boundaries and define the partition type for each partion.

1.3. Supervised Mode (a) It is important to note that when a user powers down at the end of a session in Supervised Mode the WRM-SRT is discarded, removing all pointers to updated sectors. An empty WMR-SRT returns the WMR partition to its original state, which reflects the WMR partition state after the last change made when the system was in Unsupervised mode.

(b) The WMR-SRT is initialised ready for use.

(c) Partition bounds and number of partitions are checked against a table stored in either the dedicated area 2 or Supervisor Flash ROM (FIG. 6, 213). If during Unsupervised Mode, the user has altered the configuration of partitions without reconfiguring this table, then Supervised Mode may be, denied until this is rectified. Alternatively, the table may be generated each time the user enters Supervised Mode, using a scheme which does not require user intervention.

(d) The user is prompted to select a partition, for normal reading and writing, from the list of general partitions. This is done prior to any operations of the operating system and storage medium 1. The selected partition is defined as the 'active partition' and the remaining general partitions are defined as 'dormant' partitions. The active partition will continue to be active until the session is finished. A new session can be started when the user re-enters Supervised Mode, through resetting the system thereby clearing system RAM.

(e) As a refinement to the above at the start of a session, a user may be prompted to provide a username or password which may be compared with data in the dedicated area 2. The user may then be restricted to a subset of the general partitions from which he can select an active partition.

(f) The user is given full access to all WMR and RO partitions (and of course to the selected active partition).

4. Accessing a WMR Partition

As noted already, a WMR-SRT has been defined for each WMR partition 3, and stored in the dedicated area 2.

(a) During operation of the invention, it may be that a range of sectors may require to be updated in the WMR partition 3. When this happens, the Supervisor (not shown) generates an entry in the WMR-SRT which defines the range of sectors that are to be updated and has set a pointer to the location (in the dedicated area) where said updated sectors will be written. The original, unmodified sectors remain in their original location.

(b) The updated sectors may be stored elsewhere in the storage medium, within the dedicated area. This dedicated area may be a special partition. Alternatively, the dedicated area could be located dedicated area could be located within a dormant partition. Since the dormant partitions cannot be accessed by a user during the session it is safe to use unallocated sectors which may be released before a new session is begun. This is illustrated in FIG. 1.

(c) The Supervisor follows the flow diagram shown in. FIG. 2 whenever a request is made to write to a WMR partition 3.

Figure 3:
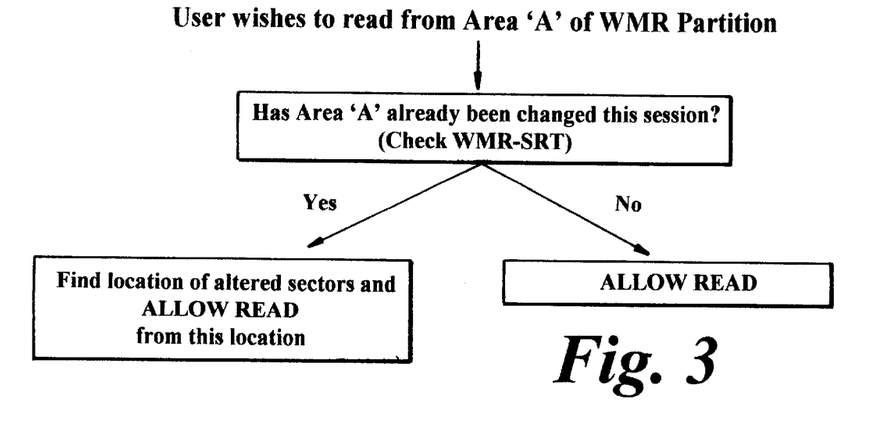
FIG. 3 a flow chart showing the squence of events should a computer system wish to read from a Write Many Recoverable (WMR) partition.

(d) The Supervisor follows the flow diagram shown in FIG. 3 whenever a request is made to read from a WMR partition 3.

(e) An alternative scheme for implementing a WMR partition is possible where write operations to said partition cause the original sectors to be copied to a secure location before allowing the write operation to complete. At the start of each session the original sectors are copied back into their original locations within the WMR partition, returning said partition to its original state.

Figure 4:
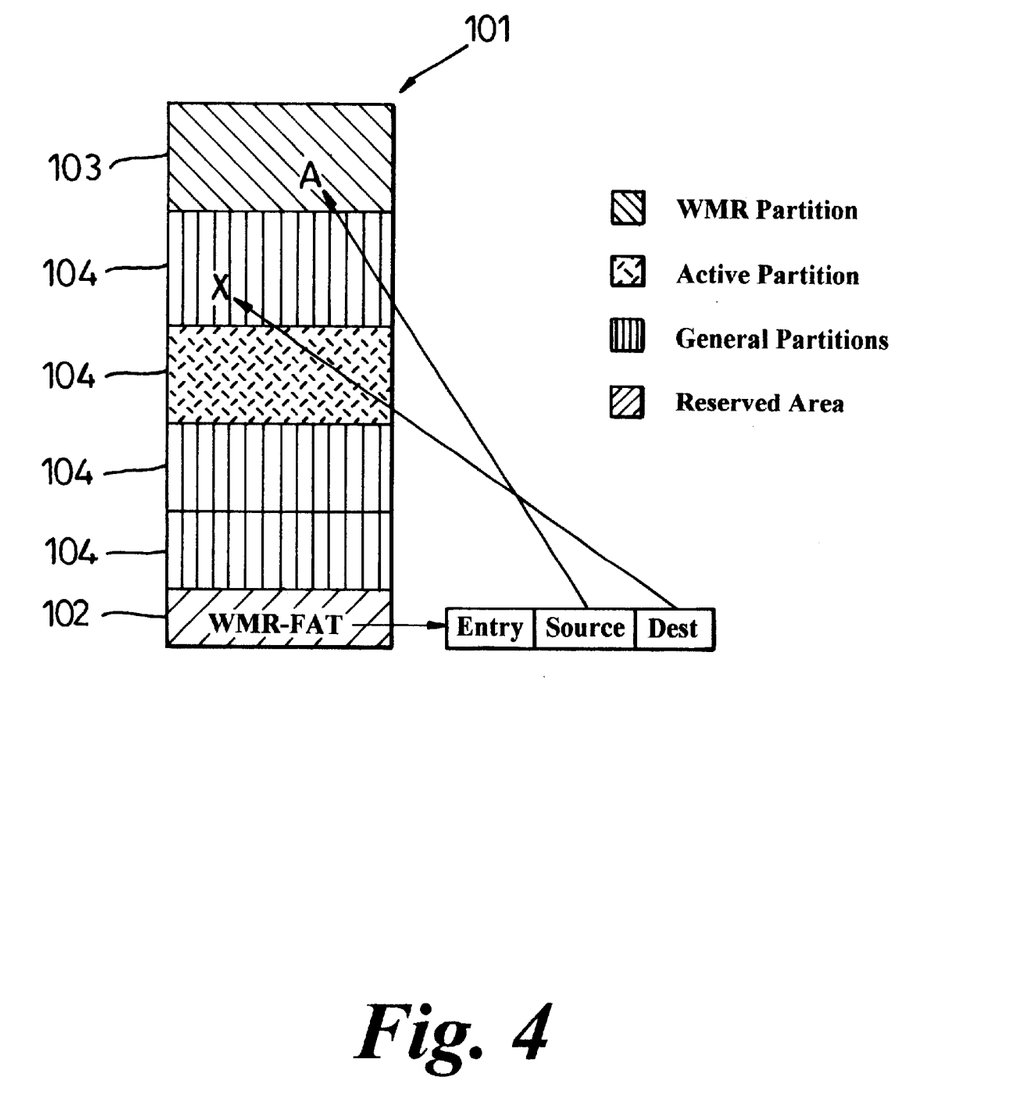
FIG. 4 a schematic diagram showing the division of a storage medium for use in the present invention.
Figure 5:
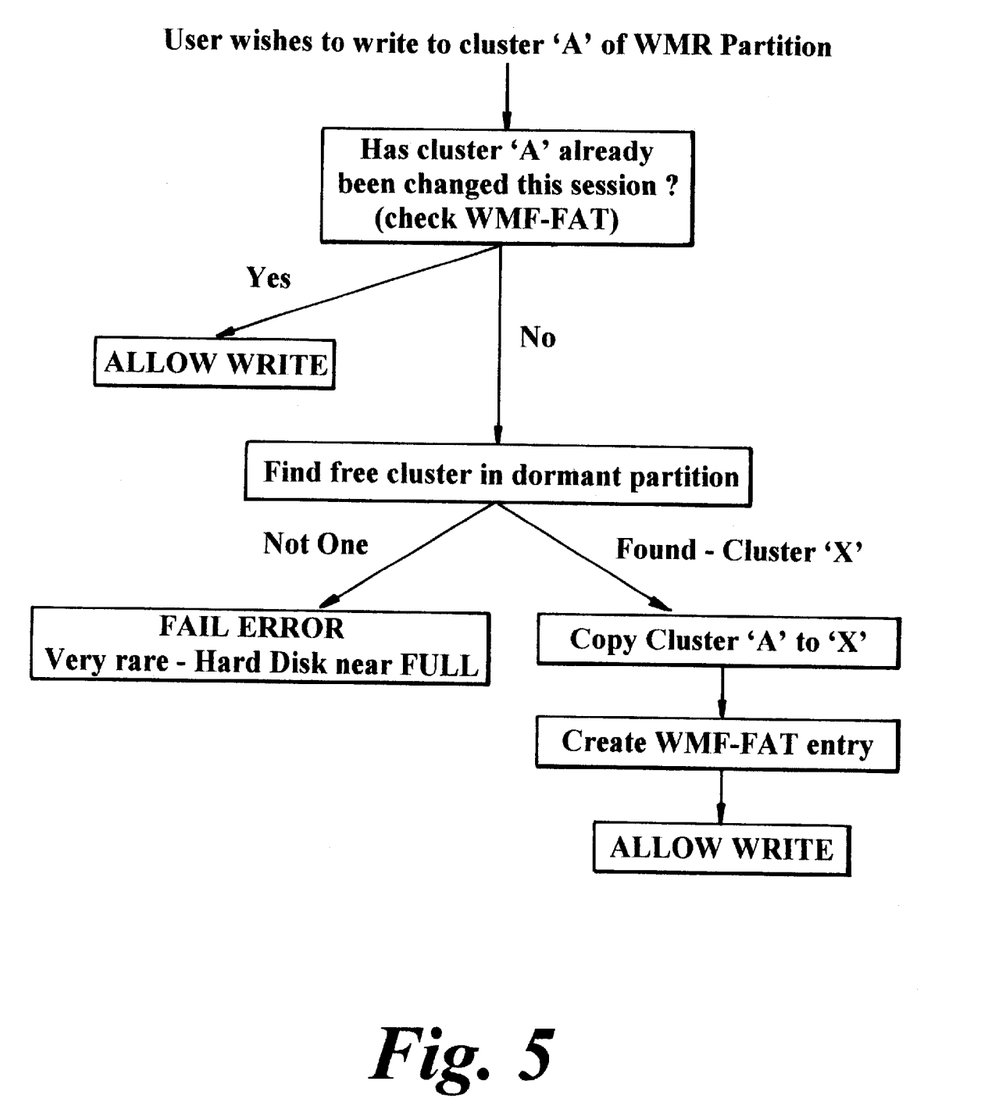
FIG. 5 a flow chart showing the sequence of events should the computer system wish to write to a Write Many Recoverable (WMR) partition used in the embodiment of FIG. 4.

Referring now to the second embodiment to FIGS. 4 and 5:

2.1. Initial Connection

When a storage medium 101 (such as a hard disk) is first connected to a computer system (not shown), space that will be inaccessible to the user is reserved on the storage medium 101. This space is a special partition and can be called Virus Isolator Space 102.

A password is entered and stored in Virus Isolation Space 2. This password is later used to allow the system to be put into Unsupervised Mode.

2.2 Unsupervised Mode

This mode requires the use of the Unsupervised Mode password (reference PCT/GB91/00261). When the system is in this mode, the user can configure both the system and the Virus Isolator Space 102.

(a) The user may define, for each partition, whether the partition is to be Read Only (RO) (not shown), Write Many Recoverable (WMR) 103, or 'general' 104. A general partition is simply a partition other than an RO or WMR partition and one which may be written to. Each WMR partition will have a File Allocation Table (WMR-FAT) allocated to it which will be held in VirusIsolation Space 102. In use, each entry in the WMR-FAT will define the address of a cluster that has been altered within a WMR partition and will include a pointer to a copy of the original unaltered cluster.

(b) The user may define a description string for each partition, defining its contents.

(c) When partitions are added or boundaries altered, the user may revise (a) and (b). If the user is not forced by the system to do this, a default will be adopted, such as 'General' status and 'Partition 104'.

The exact housekeeping that is required need not be defined since the scheme will work without the user's intervention, provided certain general guidelines are provided. For example, Partition C=WMR; all other partitions= general; partition descriptors given by their drive letter.

2.3 Supervised Mode (a) All WMR partitions 103 are restored to their original state by reference to their WMR-FAT in Virus Isolator Space 102. For consistency, this also happens when entering Unsupervised Mode.

Each WMR-FAT entry contains a pointer to (ie address of) an altered cluster within the WMR partition 102 and a pointer to a copy of the original cluster. Hence, at the start of each session, the following procedure is all that is required in order to restore the WMR partition 102: For each WMR-FAT entry:

Copy original cluster back to its location in the WMR partition 102 (copy cluster 'X' to cluster 'A' as shown in FIG. 1);

Delete the WMR-FAT entry. (Note: A power cut or system crash during this sequence will not affect the capability to restore the original WMR partition although the procedure may have to be repeated.)

(b) The WMR-FAT(s) are initialised ready for use.

(c) Partition bounds and number of partitions are checked against a table stored in Virus Isolator Space 102. If during Unsupervised Mode, the user has altered the configuration of partitions without re-configuring Virus Isolator Space 102, then Supervised Mode may be denied until this is rectified.

(d) The user is prompted to select a partition, for normal reading and writing, from the list of general partitions. This is done prior to any operations of the operating system and storage medium 101. The selected partition is defined as the 'active partition' and the remaining general partitions are defined as 'dormant' partitions. The active partition will continue to be active until the session is finished. A new session can be started when the user re-enters Supervised Mode, through clearing the system RAM and resetting the system.

(e) As a refinement to the above at the start of a session, a user may be prompted to provide a username or password which may be compared with data in Virus Isolator Space 102. The user may then be restricted to a subset of the general partitions from which he can select an active partition.

(f) The user is given full access to all WMR and RO partitions (and of course to the selected active partition).

4. Accessing a WMR Partition

As noted already, a WMR-FAT has been defined for each WMR partition 103, and stored in Virus Isolator Space 102.

(a) During operation of the invention, it may be that a cluster may require to be altered in the WMR partition 103. When,this happens, the Supervisor (not shown) generates an entry in the WMR-FAT which defines the cluster that is about to be modified and has a pointer to a copy of the original.

(b) The copy of the original cluster may be stored elsewhere in the storage medium. For example, it could be stored in a dedicated area reserved for that purpose such as a special partition or an area in Virus Isolator Space 102. Alternatively, the original cluster could be found temporary space within a dormant partition. Since the dormant partitions cannot be accessed by a user (and therefore by a virus) during the session the original cluster is safe and may be released before a new session is begun. This is illustrated in FIG. 1.

(c) The Supervisor follows the flow diagram shown in FIG. 2 whenever a write request is made to a WMR partition 103.

Referring now to FIG. 6 there is illustrated a block diagram of a hardware arrangement suitable for implementing a first embodiment of a Supervisor for use in an embodiment of the present invention. The Supervisor provides a typical bus interface 7 to a mother board of a person computer (PC) or the like, and Read Only Memory (ROM) 2 containing an appropriate BIOS (Basic Input/Output System) driver to control mode entry at the start of each session.

The Supervisor is designed to reside between the disk interface of the PC and the disk drive. The PC connects to the Supervisor through a ribbon cable 201 from the Integrated Device Electronics (IDE) bus of the PC. The Supervisor then connects with a disk drive over a second ribbon cable 202 which also behaves as an IDE bus. All communication between the PC and the hard disk is controlled by the Supervisor.

The Supervisor hardware includes a microprocessor 216, Read Only Memory (ROM) 213, holding a Supervisor Operating System and a control program, and Random Access Memory (RAM 214), which is a scratch memory used to hold parameters and WRM-SRT(s).

A dual port RAM 210 provides memory which both the PC and Supervisor processor can access. The Supervisor may use this memory to reflect IDE task registers.

Transceivers 206, 209 and multiplexors 205 allow either the PC or the Supervisor processor to access the disk drive. The Supervisor controls which of these has access. Latches 207, 208 allow the Supervisor, which has an 8 bit bus, to read and write 16 bit values to and from the disk drive.

A logic block 212 contains a latch which may be written to by the Supervisor processor. The value of this latch is compared with the PC interface upper address bus, and the BIOS 211 is only enabled when these match. This allows the BIOS to be configured, through the Supervisor, to appear anywhere in the lowest megabyte of PC address space.

A logic block 215 maps ROM 213, RAM 214 and dual port RAM 210 into the Supervisor processor address space. it also controls the access to latches 207, 208 and within logic block 212.

A logic block 204 ensures that control signals that pass between the PC and disk drive are correctly buffered and that they are inhibited when the Supervisor processor is connected to the disk drive.

A logic block 203 ensures that the communication between the Pc and the disk drive is under the control of the Supervisor. It monitors and controls read and write commands to task file registers on the disk drive. The Supervisor processor is made aware of critical operations which are being attempted and controls whether the operation is progressed, prevented or the request modified. This is implemented by decoding off the PC address lines together with read and write control signals. Certain read and write attempts cause a Supervisor processor interrupt to be generated. The Supervisor will then act based on the change. Disk drive interrupts are also routed first to the Supervisor processor where they can be passed on to the PC as required.

Inspection of FIG. 4 clearly shows that a virus can never interfere with the Supervisor microprocessor 216 since it is only able to fetch executable code from its own ROM 213.

A more detailed description of the embodiment of the Supervisor shown in FIG. 6 is not given herein, as this would be within the normal undertaking of a person skilled art.

Figure 7:
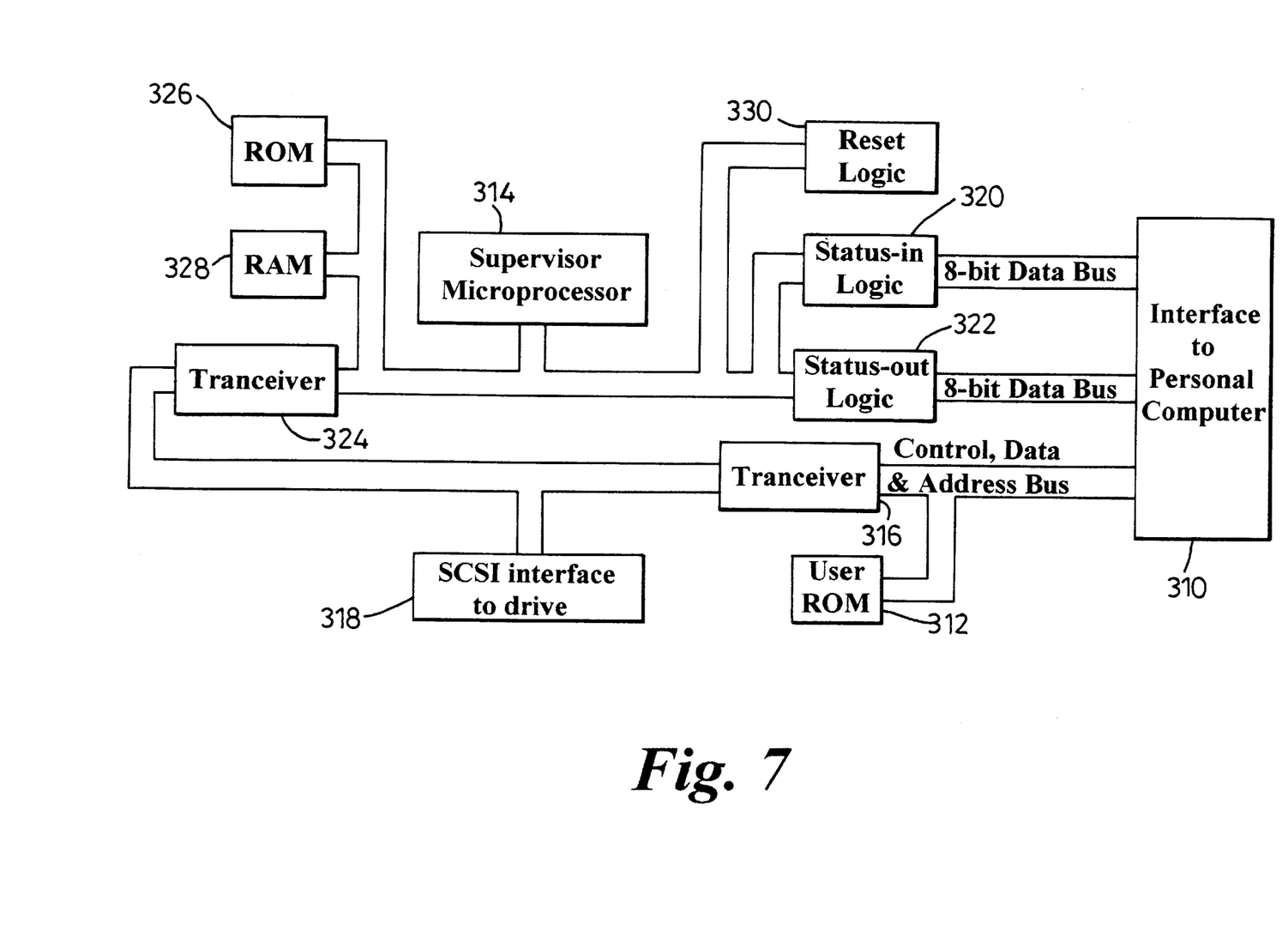
FIG. 7 a schematic block diagram of a hardware arrangement of a second embodiment of a Supervisor for use in the present invention.

Referring now to FIG. 7 there is illustrated a block diagram of a hardware arrangement suitable for implementing a second embodiment of a Supervisor for use in an embodiment of the present invention. The Supervisor provides a typical hard disk adaptor card interface 310 to a mother board of a person computer (PC) or the like, and Read Only Memory (ROM) 312 containing an appropriate BIOS (Basis Input/Output System) driver for operation of the hard disk.

The Supervisor hardware includes a microprocessor 314 and a transceiver 316, which allow the PC restricted access to a SCSI 318 such that the PC cannot directly select or arbitrate for the disk drive or issue commands over the SCSI interface 318. These operations can be performed only by the Supervisor microprocessor 314, which communicates bidirectionally with the PC using status in/out ports 320 and 322.

Communication between the microprocessor 314 and the SCSI interface 318 takes place via the bidirectional ports of a second transceiver 324. The Supervisor also includes its own Read Only Memory (ROM) 326, holding a Supervisor Operating System and a control program, and Random Access Memory (RAM) 328, which is a scratch memory used to hold parameters. Reset logic 330 is also provided, and is used for clearing the PC memory if and when an attempt is made to perform an operation prohibited by the Supervisor.

Figure 8:
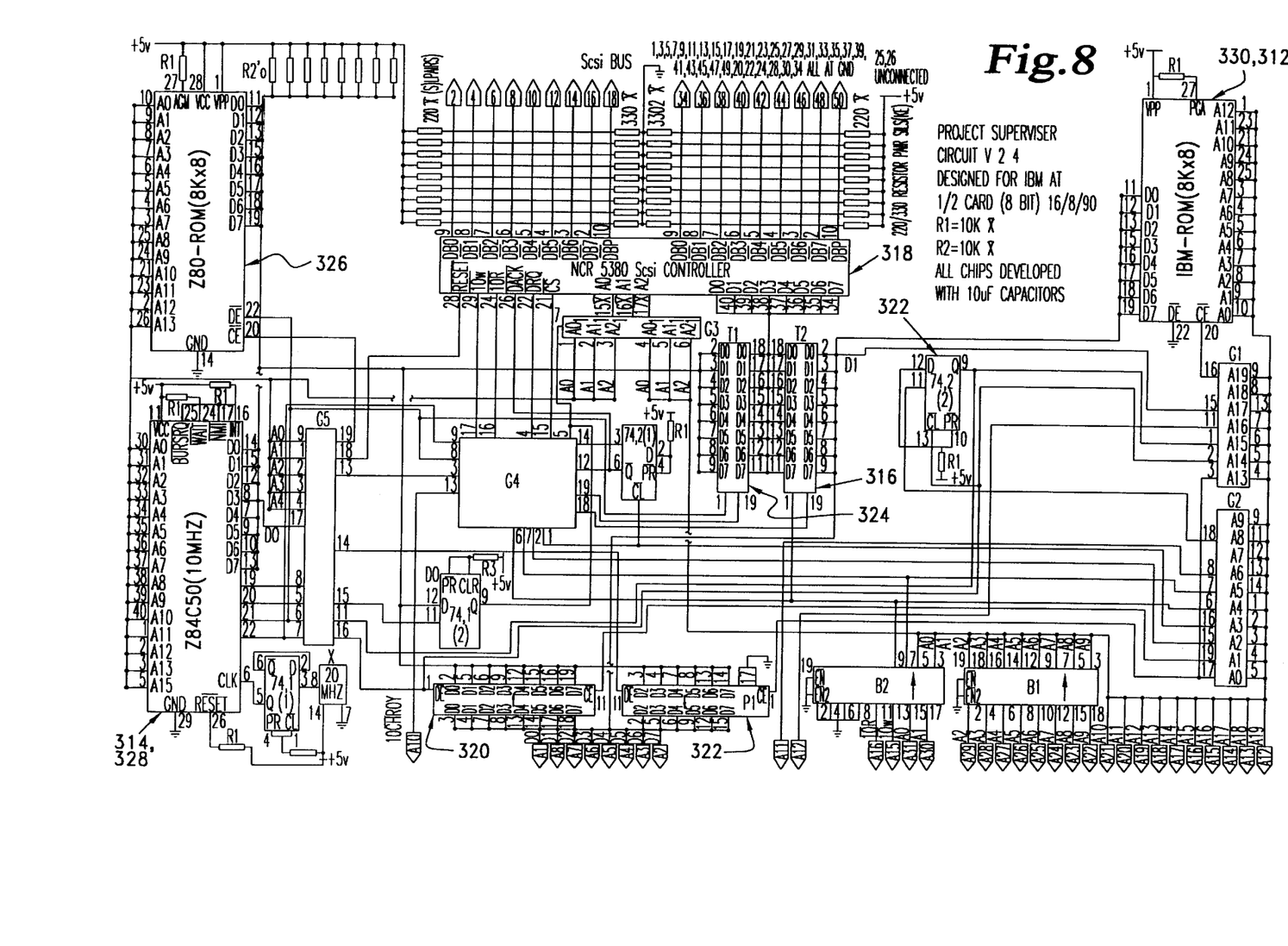
FIG. 8 a schematic circuit diagram of an actual embodiment of the Supervisor of FIG. 7.

Referring to FIG. 8 there is shown a schematic diagram of an actual embodiment of the Supervisor with the integers numbered identically to those of FIG. 7.

The embodiments of FIG. 8 further includes the following components: Gate Array Logic (GAL) devices G1–G5; buffers B1, B2; and flip-flops 74,1(1), 74,1(2) and 74,2(2).

The function of these components is as follows. G1 maps the ROM BIOS into the IBM memory map, and also provides tristate connection of the output of flip-flop 74,2(2) to the IBM data bus.

G2 provides access by the IBM to a subset of the SCSI controller's internal registers by mapping them into the IBM I/O space. G2 further provides pseudo-DMA decoding logic for data transfer to/from the SCSI controller, and maps a flag, ie. flip-flop 74,2(2) and latch P1 into the IBM I/O space.

G3 multiplexes between the Supervisor and IBM address buses, to the SCSI controller address bus.

G4 multiplexes between the Supervisor and IBM control lines to the SCSI controller. G4 also enables either (but never both) transceiver T1, T2, and includes logic for possible wait state during data transfers between the IBM and the SCSI controller.

G5 maps all ports in the Supervisor I/O space: Latches P1, P2, SCSI reset line and flip-flops 74,1(2) and 74,2(2). G5 further maps ROM into the Supervisor memory map, and provides tristate connection of output of flip-flop 74,2(2) to the Supervisor data bus.

The buffers B1, B2 ensure that there can be only one gate draining current from the IBM Backplane for each of the address, IOR and IOW lines.

Flip-flop 74,1(1) divides the clock frequency by two and squares up the pulses. Dependent on the output of 74,1(2), either the IBM has access (restricted) or the Supervisor has access, to the SCSI controller.

74,2(1) provides part of the timing for wait state generation during SCSI date transfer, while 74,2(2) is a flag to indicate that a data byte has been sent by the IBM for the attention of the Supervisor.

The components of the embodiment of FIG. 4 are as follows. GAL's G1–G5 are of the type SCS Thomson GAL 16V8-15 ns; flip-flops 74,1(1), 74,1(2), 74,2(1) and 74,2(2) are of the type 74ALS74; buffers B1, B2 are 74ALS244's; latches P1; P2 are 74ALS373's; transceivers T1, T2 are 74F245's; the processors 14 is a Zilog Z84C50 (10 MHz); the ROM 12 a 2764A (8k×8); and the SCSI controller 18 a NCR 5380.

Inspection of FIG. 8 clearly shows that a virus can never interfere with the Supervisor microprocessor 314 since it is only able to fetch executable code from its own ROM 326.

A more detailed description of the embodiment of the Supervisor shown in FIG. 8 is not given herein, as this would be within the normal undertaking of a person skilled art.

The embodiments of the present invention hereinbefore are given by way of example only, and are not meant to limit the scope thereof in any way.

It should be appreciated that the present invention seeks to alleviate the problems hereinbefore outlined in the prior art with little penalty in terms of storage or performance overhead. This invention allows a "Supervised" user full read and write access to the boot partition, whilst ensuring at the start of each session on the computer system that the boot partition is clean, virus-free and unmodified. This addresses the problems outlined above, whiles allowing maintenance of the complete virus protection disclosed in PCT/GB91/00261.

It may be envisaged that a user may wish to maintain changes between sessions. In that case, the user could create a batch file which stores the altered files in the active partition, prior to shutdown. At the start of the new session these files could replace the originals in the WMR partitions.

What is claimed is:

1. A method of controlling access to and modification of information stored on at least part of a non-volatile storage medium forming part of a computer system, the method comprising:

in response to a write command being issued to overwrite any resident information stored in said part of the storage medium with updated information, restricting modification of information stored in said part of the storage medium by (i) writing the updated information on the storage medium in a location other than where any resident information is stored, and (ii) setting up and keeping a pointer to the updated information;

providing access to information stored in said part of the storage medium, the updated information being accessed, as required, using said pointer during the remainder of the session; and subsequently clearing said pointer thereby returning said part of the storage medium to its original state.

2. A method as claimed in claim 1, wherein a system reset causes the pointer(s) to be cleared.

3. A method as claimed in claim 1, wherein said part of the storage medium comprises a boot partition on the storage medium.

4. A method as claimed in claim 1, wherein said part of the storage medium comprises a general partition.

5. A method as claimed in claim 1, further comprising supervising means separate from a central processing unit (CPU) of the computer system and made inaccessible to the user, said supervising means performing said steps of restricting modification of and providing access to information stored in said part of the storage medium.

6. A method as claimed in claim 5, wherein said supervising means allows a format operation only on a general partition which is active and prohibiting a format operation on the boot partition or on a general partition which is inactive, and causes a warning to be issued to the user should an attempt be made to perform a prohibited operation.

7. A method as claimed in claim 5, wherein space referred to as a dedicated area is reserved on the storage medium, which space is accessed only by the supervising means.

8. A method as claimed in claim 7, wherein the dedicated area is a part of the storage medium wherein access is restricted.

9. A method as claimed in claim 7, wherein for the storage of said pointer(s) said part of the storage medium has a Sector Relocation Table (SRT) associated with it, each entry in the SRT defining the address of a range of sectors in said part of the storage medium that have been updated and an address where the updated information is located within the dedicated area.

10. A method as claimed in claim 1, wherein read operations are allowed on any information in the boot partition, but an attempt to write or format the boot partition causes a system reset.

11. A method as claimed in claim 10, wherein boot sectors of the storage medium are considered to be part of the boot partition, irrespective of the position of the starting sector of the boot partition as may be defined by the storage medium operating system.

12. A method as claimed in claim 11, wherein reading of any operating system information sectors or user-generated information sectors in an active general partition is allowed, writing to such user-generated information sectors is allowed, and writing to such operating system information sectors is restricted such that an attempt to modify the size or boundaries of the partition causes a system reset.

13. A method as claimed in claim 11, wherein only the reading of information from operating system sectors of inactive general partitions is allowed, and an attempt to perform any other read, write or format operations on such partitions is denied.

14. A method as claimed in claim 13, wherein the restriction of the performance of read, write and format operations can be removed to allow set-up or maintenance of the storage medium and thereafter reinstated.

15. A method as claimed in claim 1, wherein the storage medium is any one of a hard disk, a floppy disk, an optical disk and a tape.

16. A method as claimed in claim 1, wherein the storage medium is located in a fileserve, and the computer system is a local area network, and wherein an attempt by a user computer to perform a prohibited operation causes a reset to be required of the user computer.

* * * * *

UNITED STATES PATENT AND TRADEMARK OFFICE
CERTIFICATE OF CORRECTION

PATENT NO. : 6,526,488 B1
DATED : February 25, 2003
INVENTOR(S) : Norman Jackson White, Reginald Killean (deceased) and David Robb It is certified that error appears in the above-identified patent and that said Letters Patent is hereby corrected as shown below:

Title page,
Item [56], please replace with the following:

-- U.S. PATENT DOCUMENTS

| | | | |
|---|---|---|---|
| 5,008,786 A * | 4/1991 | Thatte | 711/162 |
| 5,136,711 A | 8/1992 | Hugard et al | 395/652 |
| 5,325,519 A | 6/1994 | Long et al | 395/575 |
| 5,367,682 A | 11/1994 | Chang | 395/651 |
| 5,448,045 A | 9/1995 | Clark | 235/382 |
| 5,511,184 A | 4/1996 | Lin | 395/734 |
| 5,537,540 A | 7/1996 | Miller et al | 395/183.14 |
| 5,566,314 A * | 10/1996 | DeMarco et al | 711/103 |
| 5,619,696 A * | 7/1997 | Nakagawa | 709/100 |
| 5,657,473 A | 8/1997 | Killean et al | 711/163 |
| 5,666,514 A * | 9/1997 | Cheriton | 711/144 |
| 5,701,872 A | 12/1997 | Chejlava, Jr | 395/652 |
| 6,016,553 A | 1/2000 | Schneider et al | 714/21 |
| 6,073,239 A * | 6/2000 | Dotan | 713/200 |
| 6,249,872 B1 * | 6/2001 | Wildgrube et al | 713/200 -- |

-- FOREIGN PATENT DOCUMENTS

| | | | |
|---|---|---|---|
| GB | 2 231 418 A | 11/1990 | |
| WO | WO 91/13403 * | 9/1991 | G06F/I1/00 |
| WO | WO 93109495 | 5/1993 | |
| WO | WO 93/13477 | 7/1993 -- | |

UNITED STATES PATENT AND TRADEMARK OFFICE
CERTIFICATE OF CORRECTION

PATENT NO.    : 6,526,488 B1
DATED         : February 25, 2003
INVENTOR(S)   : Norman Jackson White, Reginald Killean (deceased) and David Robb It is certified that error appears in the above-identified patent and that said Letters Patent is hereby corrected as shown below:

Item [56], cont'd,
-- OTHER PUBLICATIONS
"Hardware gives shot in the arm to virus sufferers" Computer Design, Vol 32, No. 1, January 1993, Little Massachusetts US, pages 48-50 --

Signed and Sealed this

Fourteenth Day of October, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,526,488 B1 | Page 1 of 1 |
| APPLICATION NO. | : 09/590133 | |
| DATED | : February 25, 2003 | |
| INVENTOR(S) | : Norman Jackson White et al. | |

It is certified that error appears in the above-identified patent and that said Letters Patent is hereby corrected as shown below:

IN THE TITLE at (54) and Col. 1, line 1;

Delete "COMPUTER SYSTEMS" and replace with "METHOD FOR CONTROLLING ACCESS TO DATA BY REDIRECTING MODIFICATIONS OF THE DATA"

Signed and Sealed this

Fourteenth Day of February, 2012

David J. Kappos
*Director of the United States Patent and Trademark Office*